United States Patent
Huber et al.

(10) Patent No.: US 8,813,307 B2
(45) Date of Patent: Aug. 26, 2014

(54) VACUUM CLEANER

(75) Inventors: Franz Huber, Markt Wald (DE); Joachim Guenther, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 254 days.

(21) Appl. No.: 13/413,217

(22) Filed: Mar. 6, 2012

(65) Prior Publication Data

US 2012/0222261 A1  Sep. 6, 2012

(30) Foreign Application Priority Data

Mar. 31, 2011 (DE) .................. 10 2011 006 584

(51) Int. Cl.
```
A47L 9/10      (2006.01)
A47L 9/12      (2006.01)
B01D 46/10     (2006.01)
A47L 5/36      (2006.01)
A47L 7/00      (2006.01)
A47L 9/22      (2006.01)
B01D 46/00     (2006.01)
```
(52) U.S. Cl.
CPC .............. *A47L 7/0004* (2013.01); *A47L 9/122* (2013.01); *B01D 46/10* (2013.01); *A47L 5/365* (2013.01); *A47L 9/22* (2013.01); *B01D 46/0005* (2013.01); *B01D 2279/55* (2013.01)
USPC ............................................. 15/347; 15/353

(58) Field of Classification Search
USPC ................. 15/347, 352, 353; 134/429, 459.1, 134/459.2, 459.4, 473, 520, DIG. 2
See application file for complete search history.

(56) References Cited

U.S. PATENT DOCUMENTS

| | | | |
|---|---|---|---|
| 5,421,862 A | 6/1995 | Davis | |
| 6,521,006 B2 * | 2/2003 | Park et al. | 55/337 |
| 6,723,148 B2 * | 4/2004 | Stass | 55/385.3 |
| 6,829,804 B2 * | 12/2004 | Sepke | 15/347 |
| 6,829,805 B2 * | 12/2004 | Yang | 15/347 |
| 7,260,867 B2 * | 8/2007 | Overvaag | 15/347 |
| 2010/0139032 A1 | 6/2010 | Tomasiak | |

FOREIGN PATENT DOCUMENTS

| | | |
|---|---|---|
| AT | 242 111 B | 8/1965 |
| DE | 25 33 590 A1 | 2/1977 |
| DE | 26 15 884 A1 | 12/1977 |
| DE | 34 03 121 | 8/1985 |

\* cited by examiner

*Primary Examiner* — Dung Van Nguyen
(74) *Attorney, Agent, or Firm* — Davidson, Davidson & Kappel, LLC (57) ABSTRACT

A vacuum cleaner having a housing (12), including a filter element (31) for separating out particles (13) that have been picked up and transported in an air stream (L) as well as a holding device for holding the filter element (31) in the housing (12). The filter element (31) has at least one projecting holding section (34). The holding device (41) has a contact surface and a holding surface between which the holding section (34) of the filter element (31) comes to rest when the filter element is in the installed state. The contact surface and the holding surface are each provided with a defined irregularity.

20 Claims, 12 Drawing Sheets

VACUUM CLEANER

This claims the benefit of German Patent Application DE 10 2011 006 584.9, filed Mar. 31, 2011 and hereby incorporated by reference herein.

The invention relates to a vacuum cleaner.

BACKGROUND

Vacuum cleaners serve to pick up a wide array of materials. Aside from vacuum cleaners for dry materials, there are also vacuum cleaners for picking up liquids. Such vacuum cleaners are normally referred to as wet/dry vacuum cleaners.

Vacuum cleaners have, for example, a fan or a suction turbine as the source of negative pressure to generate an air stream that follows a flow path in the housing. Air is drawn into the housing by the negative-pressure source, for example, through a suction hose arranged at a suction opening of the housing, and subsequently blown out of the housing via a discharge opening provided on the housing at a distance from the suction opening. The area of the flow path between the suction opening and the negative-pressure source is referred to as the suction side of the vacuum cleaner. The area of the flow path between the negative-pressure source and the discharge opening is referred to as the excess-pressure side of the vacuum cleaner. In order to protect the negative-pressure source as well as the surroundings from particles that are transported along with the air stream, normally at least one filter element is provided upstream from the negative-pressure source, thus on the suction side of the negative-pressure source.

U.S. Pat. Appl. No. 2010/0139032 A1 discloses a vacuum cleaner having a housing, a filter element for separating out particles that have been picked up and transported in an air stream as well as a holding device for holding the filter element in the housing. The filter element has a projecting holding section. The holding device comprises a housing which surrounds the filter element and through which an air stream flows and it also comprises a contact surface and a holding surface between which the holding section of the filter element comes to rest when the filter element is in the installed state.

SUMMARY OF THE INVENTION

Most commercially available filter elements are manufactured in serial production for several applications and according to customer requirements. These filter elements comprise a filter material that assumes the actual filtering function and that is made, for instance, of synthetic fibers or natural products, and a carrier material that assumes the supporting and shape-retention functions and that is made of at least one soft, usually foamed material. In particular, the carrier material is subject to manufacturing tolerances in terms of its shape and position. Moreover, the properties of the carrier material change over the course of time, especially in terms of its material hardness. Aside from the supporting function, the carrier material affixed in the holding device also has a sealing function, so that the filter element arranged in the housing is sealed off relative to the surrounding negative-pressure chamber. Only a seal that is virtually 100%-effective ensures an optimal suction efficiency of the vacuum cleaner.

After a certain period of use, the filter elements become clogged by the deposited particles. This reduces the surface area available for the air stream to pass through, which considerably diminishes the suction power of the vacuum cleaner. In order not to have to always change a filter element that has become clogged, vacuum cleaners are known that have an automatic filter-cleaning system. An automatic filter-cleaning system comprises, for example, a mechanical or pneumatic device using, for instance, targeted air blasts to clean the filter element as the need arises. The particles loosened from the filter element drop into a collecting bin of the vacuum cleaner and the filter element can resume its filtering function without any appreciable influence on the suction efficiency of the vacuum cleaner.

For this reason, a filter element and especially its carrier material have to meet high requirements in terms of mechanical strength since otherwise, the desired level of tightness and positional stability of the filter element would not be ensured.

A disadvantage of the known approaches is that, when the filter element is being cleaned by means of an automatic filter-cleaning system, the filter element might be pulled into the negative-pressure chamber, as a result of which the filter is not cleaned at all or else only to a limited extent once the vacuum cleaner starts up again. Moreover, if the filter element is no longer properly held in place, malfunctions might occur during the operation of the vacuum cleaner. Dimensional tolerances, but especially hardness tolerances of the carrier material often give rise to tightness problems, particularly when the automatic filter-cleaning systems cause additional stress on the connection between the filter element and the holding device.

It is an object of the present invention to provide a vacuum cleaner that, in particular, does not entail the above-mentioned drawbacks and that allows a simple, flexible and secure fixation of the filter element in the vacuum cleaner. Furthermore, the structure of the filter element should be such that that it can be easily affixed in or on the housing of the vacuum cleaner.

The present invention provides that at least the contact surface and/or the holding surface of the holding device is provided with at least one defined irregularity.

This increases the effective surface area between the contact surface and/or the holding surface of the holding device and the area of the holding section of the carrier material that comes into contact with the corresponding surface of the holding device. Moreover, when the filter element is in its affixed state, the defined irregularity causes additional compressive forces to act on the carrier material, so that higher retention forces can be attained, thus additionally enhancing the clamping of the filter element.

The filter element is securely held with the inventive embodiment of the holding device. Moreover, it is ensured, that even in the case of automatic filter-cleaning systems, the filter element remains in its prescribed place. The filter element can be securely held in place, irrespective of the tolerance fluctuations of the carrier material or irrespective of the deformation properties of the carrier material, which change over the course of time. Furthermore, the defined irregularity ensures a sufficient deformation of the carrier material in this arrangement of the filter element, so that the filter element is sufficiently tightly sealed in its affixed state.

Preferably, the contact surface and the holding surface of the holding device are each provided with a defined irregularity, so that the area of the holding section of the carrier material that comes into contact with the two surfaces of the holding device is held in place from two sides. As a result, the filter element can be affixed even more securely and the sealing function of the filter element is additionally enhanced.

The defined irregularity can be configured as a separate element or it can be integrated into the contact surface and/or the holding surface. The holding device is made, for instance, of plastic and the defined irregularity of the contact surface and/or of the holding surface is created on the surface by means of an erosion method. Guideline VDI 3400 of the German Association of Engineers defines the roughness of plastics. Advantageously, the roughness of the contact surface and/or of the holding surface of the holding device is within the range from Ref. 35 to Ref. 45 according to VDI 3400.

Preferably, the defined irregularity on the contact surface and/or on the holding surface of the holding device is configured identically, which simplifies the production of the holding device.

As an alternative, the defined irregularity on the contact surface and on the holding surface of the holding device is configured dissimilarly, that is to say, differently. In this context, the defined irregularities are coordinated with each other in such a way that the resulting retention forces on the two surfaces of the holding device are cumulative, thus ensuring a secure fixation and sealing of the filter element, even under high mechanical and/or pneumatic loads.

Preferably, the holding device is provided on a circumferentially closed housing section through which the air stream flows, and at least the contact surface surrounds this housing section along its circumference, whereby the individual sections of the contact surface each have a lengthwise extension running along the inner opening of the housing section. This translates into an encircling seal along the circumference of the filter element. The above-mentioned housing section advantageously forms a section of a channel having corresponding side sections.

Advantageously, the holding surface of the holding device also surrounds the housing section along the circumference, so that the carrier material is securely affixed in the holding device from two sides.

Preferably, the defined irregularity of the contact surface and/or of the holding surface of the holding device is formed by at least one elevation. The at least one defined elevation creates a so-called peak-and-valley geometry, so that high clamping or compressive forces act upon the carrier material of the filter element when the latter is being held by the holding device.

Preferably, the at least one elevation comprises at least one rib, as a result of which an advantageous peak-and-valley geometry is created in the contact area between the corresponding surface of the holding device and the corresponding area of the carrier material of the filter element.

Advantageously, the at least one rib is oriented along the lengthwise extension of the contact surface, as a result of which a preferred fixation and sealing of the filter element exist along the entire length of the contact surface.

Preferably, the at least one elevation comprises several ribs, as a result of which an even more advantageous peak-and-valley geometry is created in the contact area between the corresponding surface of the holding device and the corresponding area of the carrier material of the filter element.

The multiple ribs are preferably oriented at an angle relative to the lengthwise extension of the contact surface, whereby the angle relative to this lengthwise extension is advantageously 1° to 89°, and especially advantageously 40° to 50°. This approach is particularly advantageous because the forces that act upon the filter element during the operation of the vacuum cleaner are usually exerted normally to the lengthwise extension of the contact surface. Due to the slanted orientation of the ribs, these forces are deflected and thus broken down into smaller force components. This means that even elevations of a small magnitude are sufficient to hold the filter element sufficiently securely under the load conditions encountered during the operation of the vacuum cleaner.

Preferably, a first group of ribs oriented in a first direction and a second group of ribs oriented in a second direction that differs from the first direction are provided, as a result of which another type of an advantageous peak-and-valley geometry is created in the contact area between the corresponding surface of the holding device and the corresponding area of the carrier material of the filter element. Particularly advantageously, the ribs of the individual groups are oriented with respect to each other in such a way that they cross over or intersect each other in the area of the corresponding surface of the holding device.

Advantageously, all of the ribs of one group have the same extension along the corresponding surface of the holding device. Especially advantageously, all of the ribs of both groups have the same extension along the corresponding surface of the holding device.

Preferably, the individual ribs run parallel to each other, so that an advantageous peak-and-valley geometry is created with spaces of a uniform size between the elevations or ribs.

In a preferred variant, the defined irregularity of the contact surface and/or of the holding surface of the holding device is formed by several elevations which are configured as separate, discrete elements. These separate elements are arranged so as to be distributed along the corresponding surface of the holding device and penetrate the carrier material of the filter element at certain points when the filter element is secured in the holding device.

Preferably, the separate, discrete elements are arranged along the contact surface and/or the holding surface of the holding device in a uniform grid so that the filter element is securely held in the holding device.

Preferably, the separate, discrete elements have a partially spherical, cylindrical, conical and/or truncated-conical configuration, as a result of which the type of penetration of these separate elements into the carrier material of the filter element takes place in a way that is advantageous for a given type of the carrier material.

In another preferred variant, the defined irregularity is formed by roughness of the contact surface and/or of the holding surface. The roughness increases the friction that arises between the corresponding surface of the holding device and the carrier material of the filter element when the filter element is under load. Advantageously, the roughness corresponds to that of sandpaper with a grain of 6 to 450, and especially advantageously to that of sandpaper with a grain of 40 to 150 and very particularly advantageously to that of sandpaper with a grain of 80. The grain values given here are in accordance with the standard of the Coated Abrasive Manufacturing Institute (CAMI).

In another advantageous variant, a separate irregularity element is provided that has the defined irregularity on at least one side and that can be affixed to the contact surface and/or to the holding surface of the holding device, thus making it possible to retrofit the holding device of a commercially available vacuum cleaners or vacuum cleaners already in use. Advantageously, a layer of adhesive is provided on the separate irregularity element in the sections that come into contact with the corresponding surface of the holding device. The adhesive is advantageously provided with a peel-off cover film that protects it during storage as well as during transport until the separate irregularity element is placed onto the corresponding surface of the holding device.

Depending on the type of carrier material and especially as a function of its deformation properties, different embodiments of the elevations can ensure an advantageous fixation of the filter element and can seal it securely. In this context, different configurations of elevations can be combined with each other, if applicable.

Preferably, the vacuum cleaner has a collection bin to collect and at least temporarily store the picked-up particles, and it also has a suction head that can be arranged on the collection bin, whereby the contact surface of the holding device is provided on the collection bin and the holding surface of the holding device is provided on the suction head. As an alternative, the holding surface of the holding device is provided on the collection bin and the contact surface of the holding device is provided on the suction head. Advantageously, in order to secure the suction head on the collection bin, a locking mechanism is provided that holds the suction head on the collection bin when it is secured there. Here, in an advantageous manner, the corresponding section of the carrier material of the filter element is clamped between the contact surface and the holding surface of the holding device while, at the same time, the filter element is affixed. Moreover, this embodiment of the invention renders the filter element easily accessible when the suction head is detached from the collection bin.

The invention will be explained below in greater detail schematically and by way of an example on the basis of figures.

BRIEF DESCRIPTION OF THE DRAWINGS

The figures are described with respect to each other and in an overarching manner. The same reference numerals indicate the same components.

The following is shown:

FIG. 7 A, B—a fifth example of a holding device, once as a section in a cross-sectional view (FIG. 7A) and once in a top view (FIG. 7B);

FIG. 8 A, B—a sixth example of a holding device, once as a section in a cross-sectional view (FIG. 8A) and once in a top view (FIG. 8B);

FIG. 9 A, B—a seventh example of a holding device, once as a section in a cross-sectional view (FIG. 8A) and once in a top view (FIG. 8B).

DETAILED DESCRIPTION

Figure 1:
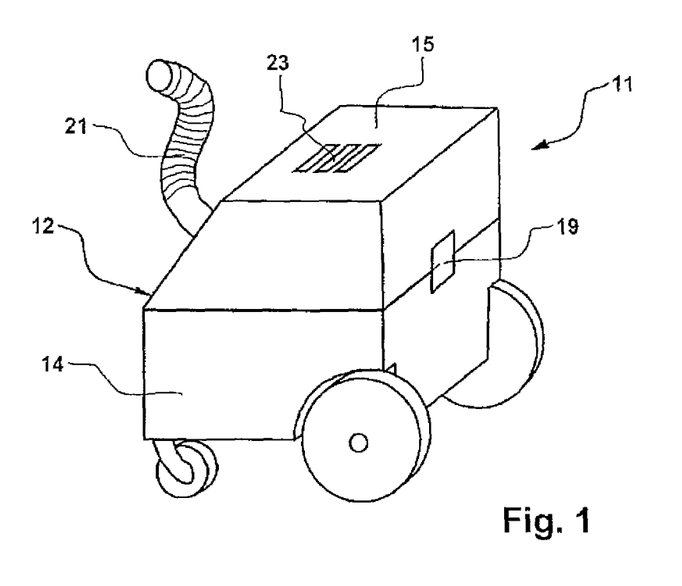
FIG. 1—a vacuum cleaner in a perspective view.
Figure 2:
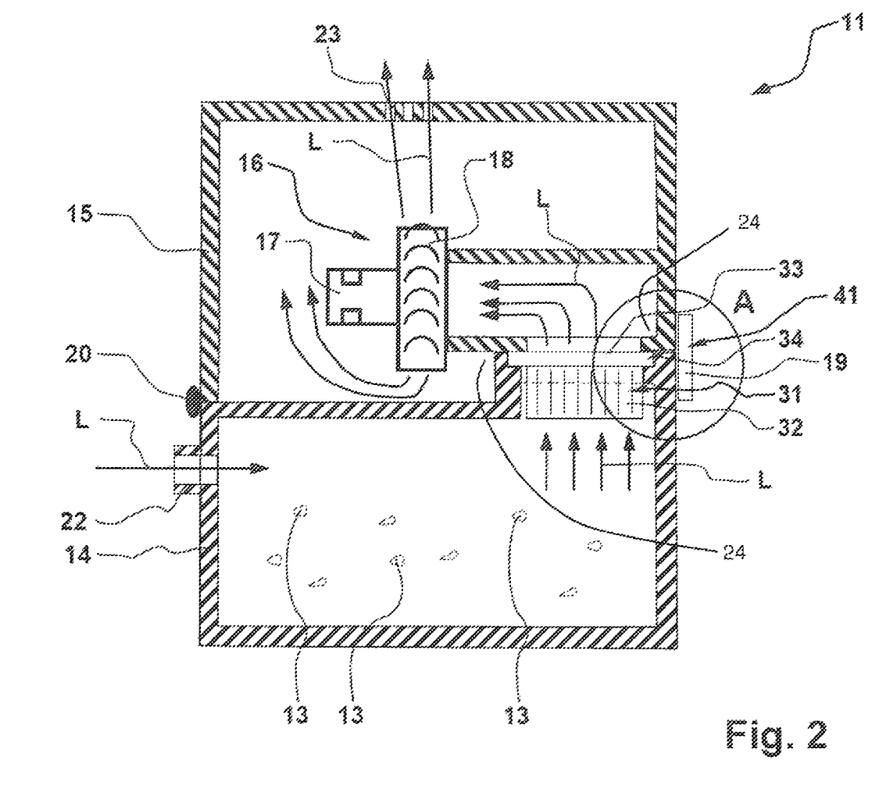
FIG. 2—the vacuum cleaner according to FIG. 1 in a schematic cross-sectional view.

The vacuum cleaner 11 shown in FIGS. 1 and 2 has a housing 12. The vacuum cleaner 11 comprises a collection bin 14 in which picked-up particles 13 are collected, as well as a suction head 15 in which a negative-pressure source 16 is provided as the vacuum source. The suction head 15 is joined to the collection bin 14 in such a way that, after a locking mechanism has been released, the suction head 15 can be removed from the collection bin 14. The negative-pressure source 16 comprises, for example, a fan 18 driven by a motor 17.

The air stream L generated by the negative-pressure source 16 flows through a suction hose 21 that is connected to a suction opening 22 provided on the housing 12, then through the collection bin 14, subsequently through a filter element 31 arranged upstream from the negative-pressure source 16 with respect to the path of the air stream L and thus on the suction side, and finally out into the atmosphere through discharge openings 23 arranged on the suction head 15. The discharge openings 23 are at a distance from the suction opening 22, whereby the flow path leads from the suction opening 22 to the discharge openings 23. Alternatively, the suction opening can be provided in the suction head 15. The air stream L flows through a hose section into the collection bin 14.

In the case of the vacuum cleaner 11 shown here, the negative-pressure source 16 is supplied with electricity, for example, by means of a power line that can be connected to the mains power supply. As an alternative or in addition to this, the vacuum cleaner 11 can also be supplied with the electricity it needs for its operation, for instance, by means of battery packs arranged in the vacuum cleaner 11.

The filter element 31 serves to segregate picked-up dust particles 13 that are transported in the air stream L, and it has a filter material 32 as well as a carrier material 33, whereby the carrier material 33 has a projecting holding section 34 for affixing the filter element 31.

Figure 3A:
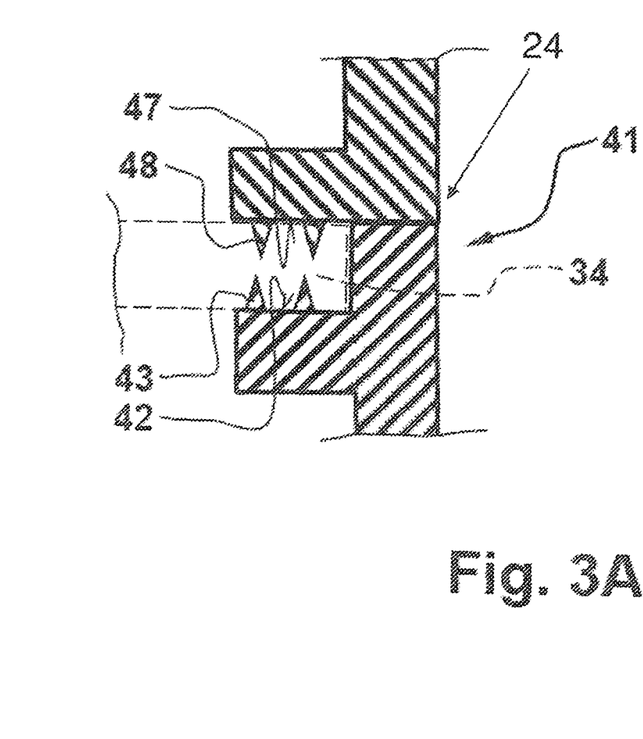
FIG. 3A,B—a first example of a holding device according to detail A in FIG. 2, once as a section in a cross-sectional view (FIG. 3A) and once in a top view (FIG. 3B)
Figure 3B:
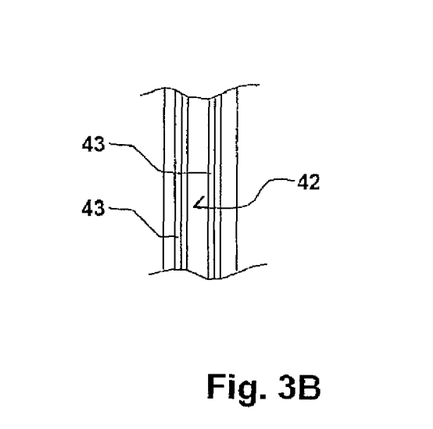

In order to hold the filter element 31 in the housing 12, a holding device 41 is provided which is shown in detail in FIGS. 3A and 3B. The holding device 41 has a contact surface 42 and a holding surface 47, between which the holding section 34 of the filter element 31 comes to rest when the filter element 31 is in the installed state.

The contact surface 42 and the holding surface 47 of the holding device 41 are provided with a defined irregularity. In the first embodiment, the defined irregularity is configured identically on the contact surface 42 and on the holding surface 47 of the holding device 41.

The holding device 41 is provided with a circumferentially closed housing section 24 through which the air stream L flows, whereby the contact surface 42 and the holding surface 47 surround the entire circumference of this housing section 24. The individual sections of the contact surface 42 or of the holding surface 47 each have a lengthwise extension running along the inner opening of the housing section 24.

The defined irregularity of the contact surface 42 and of the holding surface 47 of the holding device 41 is formed by elevations in the form of several ribs 43 or 48. The ribs 43 or 48 are each oriented along the lengthwise extension of the corresponding surface 42 or 47, respectively, of the holding device 41. The individual ribs 43 or 48 run parallel to each other. The contact surface 42 and the ribs 43 or the contact surface 47 and the ribs 48 are each configured as a single part.

After the filter element 31 has been inserted into the vacuum cleaner 11, the suction head 15 is placed onto the collection bin 14 and then pressed onto the collection bin 14 by means of the locking mechanism 19. In this process, the ribs 43 and 48 engage with the holding section 34 of the carrier material 33, so that the filter element 31 is securely held in the holding device 31.

Figure 4A:
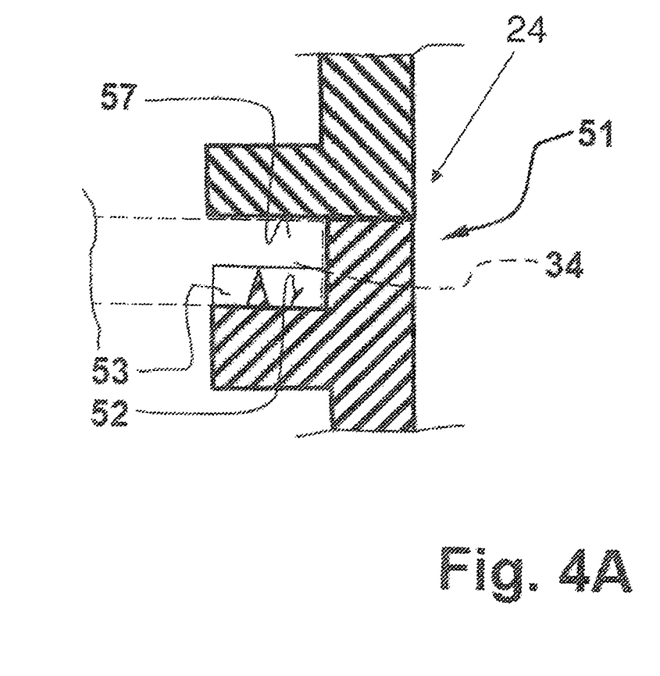
FIG. 4A,B—a second example of a holding device, once as a section in a cross-sectional view (FIG. 4A) and once in a top view (FIG. 4B)
Figure 4B:
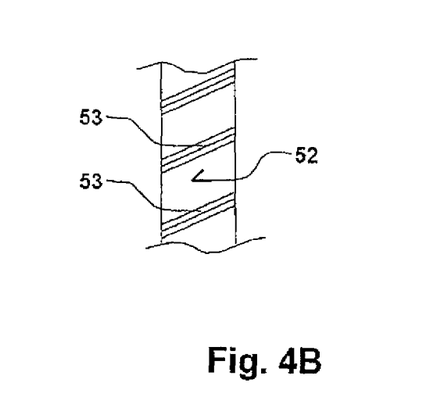

In the variant of the holding device 51 shown in FIGS. 4A and 4B, the contact surface 52 has a defined irregularity in the form of several ribs 53 that are oriented parallel to each other and at an angle of 40° to 50° relative to the lengthwise extension of the contact surface 52. In this embodiment, no defined irregularity is provided on the holding surface 57. However, it is conceivable to also provide the holding surface 57 with a defined irregularity, whereby it can be configured identically or differently from the configuration of the defined irregularity of the contact surface 52.

Figure 5A:
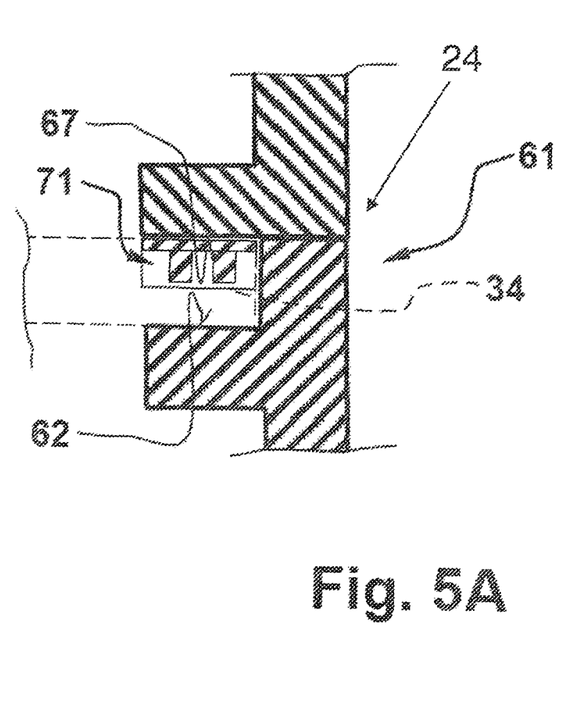
FIG. 5A, B—a third example of a holding device, once as a section in a cross-sectional view (FIG. 5A) and once in a top view (FIG. 5B)
Figure 5B:
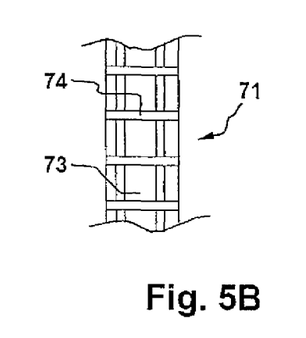
Figure 5C:
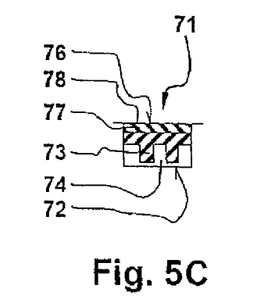
FIG. 5C—the separate irregularity element in a detailed view.

In another variant of the holding device 61, as is depicted in FIGS. 5A to 5C, a separate irregularity element 71 is provided in each case that can be affixed to the holding surface 67 of the holding device 61. In this embodiment, no separate irregularity element is provided on the contact surface 62. However, it is conceivable to also provide the contact surface 62 with a defined irregularity, whereby the latter can be configured so as to be identical to or different from the configuration of the defined irregularity of the holding surface 67.

On a first side 72, the separate irregularity element 71 has a first group of ribs 73 oriented in a first direction, here parallel to the lengthwise extension of the separate irregularity element 71, and a second group of ribs 74 oriented in a second direction that differs from the first direction, here perpendicular to the lengthwise extension of the separate irregularity element 71, whereby the ribs 73 and 74 together form the defined irregularity. In this embodiment, relative to the contact surface 62, the ribs 73 have a lower height than the ribs 74.

On a second side 76, which is located opposite from the first side 72 with the defined irregularity, there is an adhesive layer 77 provided with a peel-off cover film 78 that is left on until the separate irregularity element 71 is put in place (FIG. 5C). After the peel-off cover film 78 has been removed, the separate irregularity element 71 is affixed on the contact surface 62 and on the holding surface 67 of the holding device 61, thus allowing existing vacuum cleaners that already have a holding device for a filter element 31 to be retrofitted with the invention.

Figure 6A:
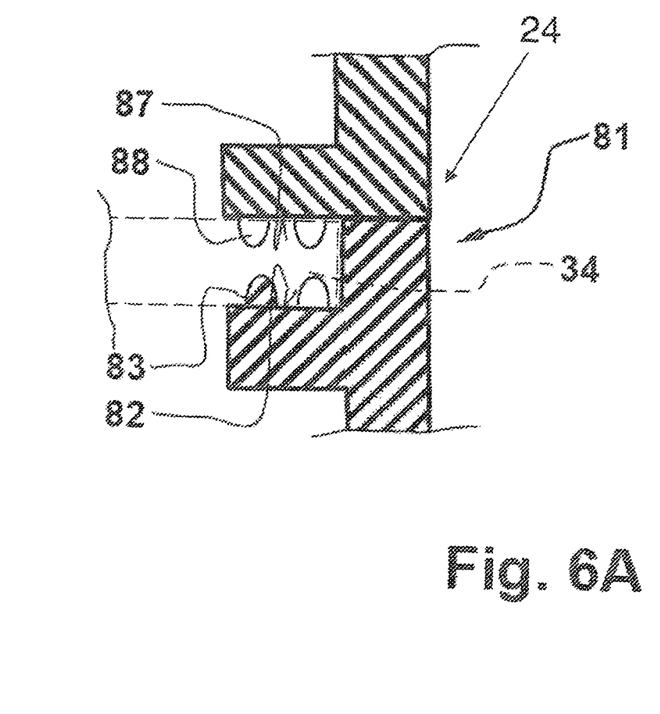
FIG. 6A, B—a fourth example of a holding device, once as a section in a cross-sectional view (FIG. 6A) and once in a top view (FIG. 6B)
Figure 6B:
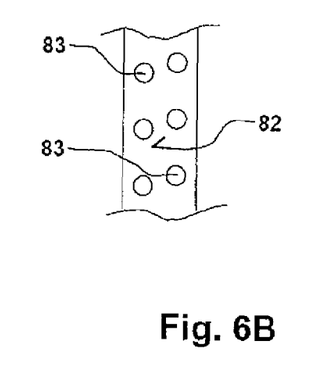

In the variant of the holding device 81 shown in FIGS. 6A and 6B, the defined irregularity of the contact surface 82 and of the holding surface 87 of the holding device 81 is formed by several elevations that are configured as separate, discrete elements 83 or 88, respectively. The separate, discrete elements 83 or 88 are arranged in a regular grid along the contact surface 82 and the holding surface 87 of the holding device 81, and they have a partially spherical configuration.

Figure 7A:
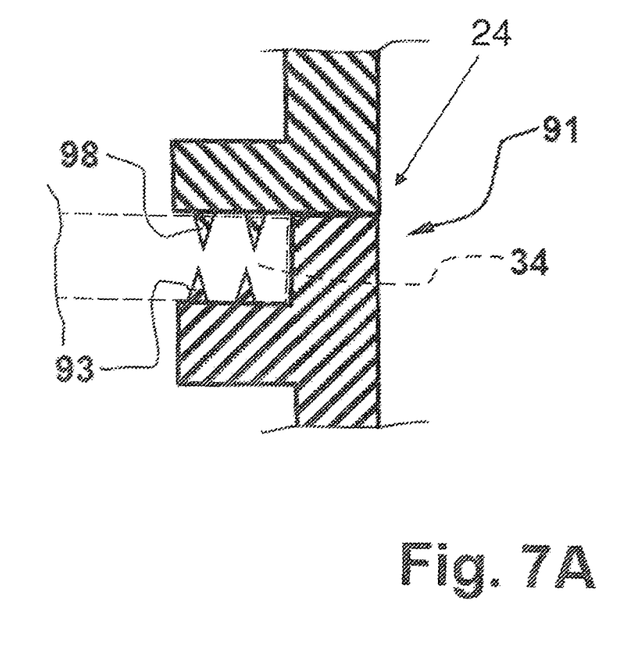
Figure 7B:
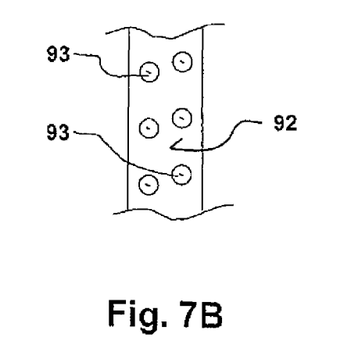

In contrast to this, in the variant of the holding device 91 according to FIGS. 7A and 7B, the defined irregularity of the contact surface 92 and of the holding surface 97 is formed by separate, discrete elements 93 or 98, respectively, and they have a conical configuration.

Figure 8A:
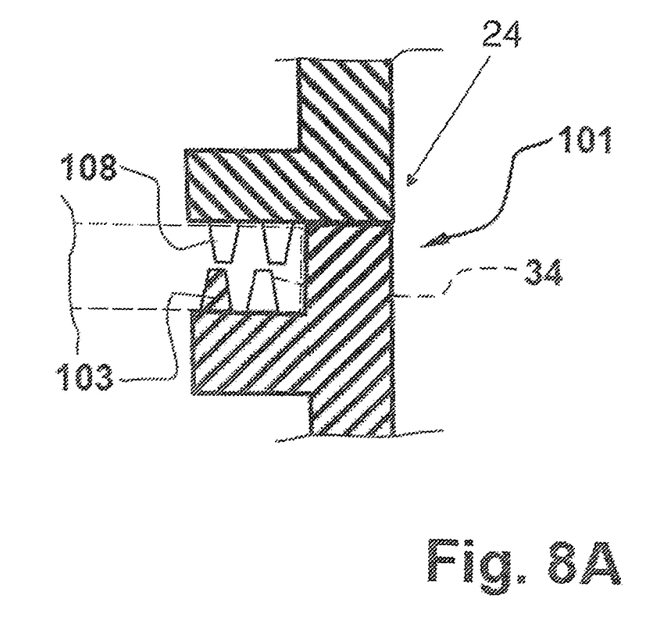
Figure 8B:
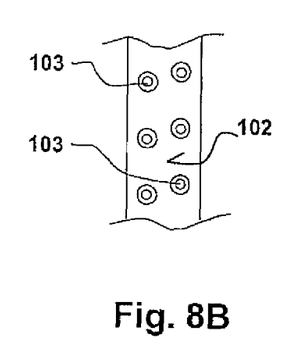

In the variant of the holding device 101 according to FIGS. 8A and 8B, the defined irregularity of the contact surface 102 and of the holding surface 107 of the holding device 101 is formed by separate, discrete elements 103 or 108, respectively, and they have a truncated-conical configuration.

Figure 9A:
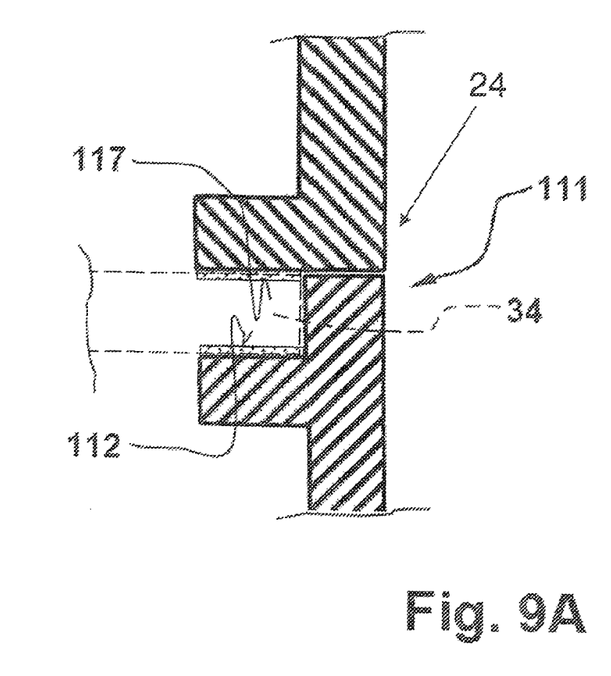
Figure 9B:
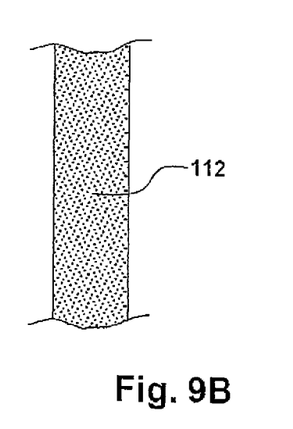

In the variant of the holding device 111 according to FIGS. 9A and 9B, the defined irregularity is formed by roughness of the contact surface 112 and of the holding surface 117 of the holding device 111. In this example, the roughness corresponds to a sandpaper grain of 80 according to the CAMI standard.

Of course, the individual details described in conjunction with the figures can also be provided for the other embodiments.

What is claimed is:

1. A vacuum cleaner comprising:
   a housing;
   at least one filter element for separating out particles picked up and transported in an air stream;
   a holder for holding the at least one filter element on or in the housing,
   the at least one filter element having at least one holding section,
   the holder having a contact surface and a holding surface, the holding section of the filter element coming to rest between the contact surface and the holding surface when the filter element is in an installed state,
   at least one of the contact surface and the holding surface being provided with at least one defined irregularity formed by at least one elevation, the at least one elevation includes at least one rib, individual sections of the contact surface each having a lengthwise extension running along an inner opening of the housing section, and the rib is oriented along a lengthwise extension of the contact surface.

2. The vacuum cleaner as recited in claim 1 wherein the contact surface and the holding surface are each provided with the at least one defined irregularity.

3. The vacuum cleaner as recited in claim 2 wherein the at least one defined irregularity on the contact surface and on the holding surface is configured identically.

4. The vacuum cleaner as recited in claim 2 wherein the at least one defined irregularity on the contact surface and on the holding surface is configured dissimilarly.

5. The vacuum cleaner as recited in claim 1 wherein the holder is provided on a housing section of the housing through which the air stream flows, and at least the contact surface surrounds the housing section along a circumference of the housing section, individual sections of the contact surface each having a lengthwise extension running along an inner opening of the housing section.

6. The vacuum cleaner according to claim 1 wherein the at least one rib includes several ribs.

7. The vacuum cleaner as recited in claim 6 wherein the several ribs are oriented at an angle relative to the lengthwise extension of the contact surface.

8. The vacuum cleaner as recited in claim 7 wherein the angle relative to the lengthwise extension is 1° to 89°.

9. The vacuum cleaner as recited in claim 8 wherein the angle is 40° to 50°.

10. The vacuum cleaner as recited in claim 6 wherein a first group of ribs is oriented in a first direction, and a second group of ribs is oriented in a second direction that differs from the first direction.

11. The vacuum cleaner as recited in claim 6 wherein individual ribs of the several ribs run parallel to each other.

12. The vacuum cleaner as recited in claim 1 wherein the at least one elevation includes several elevations configured as separate, discrete elements.

13. The vacuum cleaner as recited in claim 12 wherein the separate, discrete elements are arranged along the contact surface or the holding surface in a uniform grid.

14. The vacuum cleaner as recited in claim 12 wherein the separate, discrete elements have at least one of a partially spherical, cylindrical, conical and truncated-conical configuration.

15. The vacuum cleaner as recited in claim 1 further comprising a separate irregularity element having the defined irregularity on at least one side, the irregularity element affixable to the contact surface and/or the holding surface.

16. The vacuum cleaner as recited in claim 1 further comprising a collection bin to collect and at least temporarily store the picked-up particles, and a suction head arrangeable on the collection bin, one of the contact surface and the holding surface provided on the collection bin, and the other of the holding surface and the contact surface provided on the suction head.

17. The vacuum cleaner as recited in claim 1 wherein the holding section is a projecting holding element.

18. A vacuum cleaner comprising:
   a housing;
   at least one filter element for separating out particles picked up and transported in an air stream;
   a holder for holding the at least one filter element on or in the housing,
   the at least one filter element having at least one holding section,
   the holder having a contact surface and a holding surface, the holding section of the filter element coming to rest between the contact surface and the holding surface when the filter element is in an installed state,
   at least one of the contact surface and the holding surface being provided with at least one defined irregularity the defined irregularity being formed by roughness of the contact surface and/or of the holding surface, wherein the roughness corresponds to that of sandpaper with a grain of 6 to 450.

19. The vacuum cleaner as recited in claim 18 wherein the grain is 40 to 150.

20. The vacuum cleaner as recited in claim 19 wherein the grain is 80.

* * * * *